(12) United States Patent
Sudou et al.

(10) Patent No.: US 6,985,805 B2
(45) Date of Patent: Jan. 10, 2006

(54) ADAPTIVE CRUISE CONTROL SYSTEM

(75) Inventors: Hideki Sudou, Tokyo (JP); Takenori Hashizume, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 126 days.

(21) Appl. No.: 10/458,619

(22) Filed: Jun. 11, 2003

(65) Prior Publication Data

US 2003/0234127 A1  Dec. 25, 2003

(30) Foreign Application Priority Data

Jun. 19, 2002  (JP)  .............................. 2002-178862

(51) Int. Cl.
*B60K 31/00*  (2006.01)

(52) U.S. Cl. ..................... 701/96; 701/93; 701/301; 340/435; 340/903; 180/170

(58) Field of Classification Search .................. 701/93, 701/96, 301; 340/903, 435, 436; 180/169, 180/170; 123/352
See application file for complete search history.

(56) References Cited

U.S. PATENT DOCUMENTS 5,400,864 A * 3/1995 Winner et al. .............. 180/169

6,311,120 B1   10/2001  Asada
6,493,625 B2 * 12/2002  Andreas et al. .............. 701/96
6,629,036 B2 *  9/2003  Hirao .......................... 701/301

FOREIGN PATENT DOCUMENTS

JP     10-272963 A    10/1998
JP     11-192858 A     7/1999

* cited by examiner

*Primary Examiner*—Gary Chin
(74) *Attorney, Agent, or Firm*—Foley & Lardner LLP (57) ABSTRACT

In an adaptive cruise control (ACC) system with object detection system interaction, capable of executing a vehicle speed holding mode, a constant-speed control mode, and a following control mode, a lane-change detector is provided to detect the presence or absence of a driver's intention for a lane change by the host vehicle. An ACC unit executes the vehicle speed holding mode during which the host vehicle's speed is restricted until such time that a predetermined holding time has expired from a time when the object detection system loses the preceding vehicle during the following control mode, and thereafter executes the constant-speed control mode during which the host vehicle's speed is automatically accelerated up to a set speed. The ACC unit releases the vehicle speed holding mode, in presence of the driver's intention for the lane change when the object detection system loses the preceding vehicle during the following control mode.

12 Claims, 5 Drawing Sheets

ADAPTIVE CRUISE CONTROL SYSTEM

TECHNICAL FIELD

The present invention relates to an adaptive vehicle speed control system or an adaptive cruise control (ACC) system for automotive vehicles, and specifically to the improvement of an automatic speed-control technology containing a so-called following control function, a constant-speed control function, and a host vehicle speed holding function.

BACKGROUND ART

In recent years, there have been proposed and developed various automatic speed control technologies. An adaptive cruise control system, capable of executing a following control function, has been disclosed in Japanese Patent Provisional Publication No. 11-192858 (hereinafter is referred to as "JP11-192858"), corresponding to U.S. Pat. No. 6,311,120, issued on Oct. 30, 2001. In the automatic speed control device disclosed in JP11-192858, during a following control mode in which a host vehicle (an ACC vehicle) can automatically follow a preceding vehicle, while maintaining the host vehicle's distance from the preceding vehicle at a desired inter-vehicle distance, the device controls the host vehicle's speed so that the host vehicle is automatically accelerated up to a preset vehicle speed, when the preceding vehicle itself changes its traffic lane and disappears from the host vehicle's driving lane. On the other hand, when the preceding vehicle actually exists ahead of the host vehicle but an inter-vehicle distance sensor, employed in the host vehicle, loses the track of the preceding vehicle owing to various factors, for example, curves, slopes, weather or the like, the device disclosed in JP11-192858 maintains or holds the host vehicle's speed at a vehicle speed given at the time when the preceding vehicle has been lost, until such time that the host vehicle reaches a lost point where the preceding vehicle has been lost, so as to inhibit the automatic accelerating mode from being initiated and to prevent the host vehicle's distance from the preceding vehicle from being reduced inadvertently or undesirably.

SUMMARY OF THE INVENTION

In order for the host vehicle to smoothly pass the preceding vehicle, usually, it is desirable to accelerate the host vehicle for a while during passing. However, even when the inter-vehicle distance sensor loses the track of the preceding vehicle as a result of the host vehicle's lane change during passing, the speed control device disclosed in JP11-192858 may fix the host vehicle's speed to a vehicle speed given at a time when the preceding vehicle has been lost, until the host vehicle reaches a lost point. The fixed host vehicle's speed deteriorates the vehicle driveability, in particular, the acceleration feel and passing ability, when the inter-vehicle distance sensor loses the track of the preceding vehicle owing to the host vehicle's lane change for passing during the automatic following control mode.

Accordingly, it is an object of the invention to provide an adaptive cruise control (ACC) system, capable of adding a better acceleration feel and a better passing ability and ensuring an enhanced vehicle's driveability matching the driver's sense, even when a host vehicle itself changes its traffic lane due to a driver's intention for lane changing during a following control mode and as a result the preceding vehicle has been lost.

In order to accomplish the aforementioned and other objects of the present invention, an adaptive cruise control system capable of executing at least a vehicle speed increase restriction control mode, an automatic accelerating control mode, and a following control mode, comprises an object detector that captures a preceding vehicle positioned ahead of a host vehicle, a lane-change detector that detects the presence or absence of a driver's intention for a lane change by the host vehicle, an adaptive vehicle speed control unit executing the following control mode during which the host vehicle automatically follows the preceding vehicle, maintaining a host vehicle's distance from the preceding vehicle at a desired inter-vehicle distance when the preceding vehicle exists ahead of the host vehicle, the adaptive vehicle speed control unit executing the vehicle speed increase restriction control mode during which an increase in the host vehicle's speed is restricted until such time that a time period corresponding to either of a predetermined distance and a predetermined holding time has expired from a time when the object detector loses the preceding vehicle during the following control mode, and thereafter executing the automatic accelerating control mode during which the host vehicle's speed is automatically accelerated up to a set speed, and the adaptive vehicle speed control unit comprising a vehicle speed increase restriction control releasing section that releases the vehicle speed increase restriction control mode, in presence of the driver's intention for the lane change when the object detector loses the preceding vehicle during the following control mode.

According to another aspect of the invention, an adaptive cruise control system capable of executing at least a vehicle speed increase restriction control mode, an automatic accelerating control mode, and a following control mode, comprises an object detection means for capturing a preceding vehicle positioned ahead of a host vehicle, a lane-change detection means for detecting the presence or absence of a driver's intention for a lane change by the host vehicle, an adaptive vehicle speed control unit executing the following control mode during which the host vehicle automatically follows the preceding vehicle, maintaining a host vehicle's distance from the preceding vehicle at a desired inter-vehicle distance when the preceding vehicle exists ahead of the host vehicle, the adaptive vehicle speed control unit executing the vehicle speed increase restriction control mode during which an increase in the host vehicle's speed is restricted until such time that a time period corresponding to either of a predetermined distance and a predetermined holding time has expired from a time when the object detection means loses the preceding vehicle during the following control mode, and thereafter executing the automatic accelerating control mode during which the host vehicle's speed is automatically accelerated up to a set speed, and the adaptive vehicle speed control unit comprising a vehicle speed increase restriction control releasing means for releasing the vehicle speed increase restriction control mode, in presence of the driver's intention for the lane change when the object detection means loses the preceding vehicle during the following control mode.

According to a further aspect of the invention, an adaptive cruise control system capable of executing at least a vehicle speed holding mode, a constant-speed control mode, and a following control mode, comprises an object detector that captures a preceding vehicle positioned ahead of a host vehicle, a lane-change detector that detects the presence or absence of a driver's intention for a lane change by the host vehicle, an adaptive vehicle speed control unit electronically connected to the object detector and the lane-change detector for executing the following control mode during which the host vehicle automatically follows the preceding vehicle, maintaining a host vehicle's distance from the preceding vehicle at a desired inter-vehicle distance when the preceding vehicle exists ahead of the host vehicle, the adaptive vehicle speed control unit executing the vehicle speed holding mode during which the host vehicle's speed is restricted until such time that a time period corresponding to either of a predetermined distance and a predetermined holding time has expired from a time when the object detector loses the preceding vehicle during the following control mode, and thereafter executing the constant-speed control mode during which the host vehicle's speed is automatically accelerated up to a set speed, manually set by a man-machine interface, and the adaptive vehicle speed control unit initiating the constant-speed control mode while inhibiting the vehicle speed holding mode, in presence of the driver's intention for the lane change when the object detector loses the preceding vehicle during the following control mode. More preferably, the adaptive vehicle speed control unit may comprise a preceding-vehicle candidate detection section that detects a vehicle positioned in either of left and right traffic lanes corresponding to a direction of the lane change based on the driver's intention as a candidate for a next preceding vehicle after the lane change by the host vehicle, and the adaptive vehicle speed control unit may continuously execute the following control mode while releasing the vehicle speed holding mode, in presence of both the driver's intention for the lane change and the candidate for the next preceding vehicle, detected after the lane change by the host vehicle, when the object detector loses the preceding vehicle during the following control mode.

According to a still further aspect of the invention, a method of controlling a host vehicle's speed by either of a vehicle speed holding mode, a constant-speed control mode, and a following control mode, the method comprises capturing a preceding vehicle positioned ahead of a host vehicle, detecting the presence or absence of a driver's intention for a lane change by the host vehicle, executing the following control mode during which the host vehicle automatically follows the preceding vehicle, maintaining a host vehicle's distance from the preceding vehicle at a desired inter-vehicle distance when the preceding vehicle exists ahead of the host vehicle, executing the vehicle speed holding mode during which the host vehicle's speed is restricted until such time that a time period corresponding to either of a predetermined distance and a predetermined holding time has expired from a time when the preceding vehicle is lost during the following control mode, and thereafter executing the constant-speed control mode during which the host vehicle's speed is automatically accelerated up to a set speed, manually set by a man-machine interface, and initiating the constant-speed control mode while inhibiting the vehicle speed holding mode, in presence of the driver's intention for the lane change when the preceding vehicle is lost during the following control mode. Preferably, the method may further comprise detecting a vehicle positioned in either of left and right traffic lanes corresponding to a direction of the lane change based on the driver's intention as a candidate for a next preceding vehicle after the lane change by the host vehicle, and continuously executing the following control mode while releasing the vehicle speed holding mode, in presence of both the driver's intention for the lane change and the candidate for the next preceding vehicle, detected after the lane change by the host vehicle when the preceding vehicle is lost during the following control mode.

The other objects and features of this invention will become understood from the following description with reference to the accompanying drawings.

DESCRIPTION OF THE PREFERRED EMBODIMENTS

Figure 1:
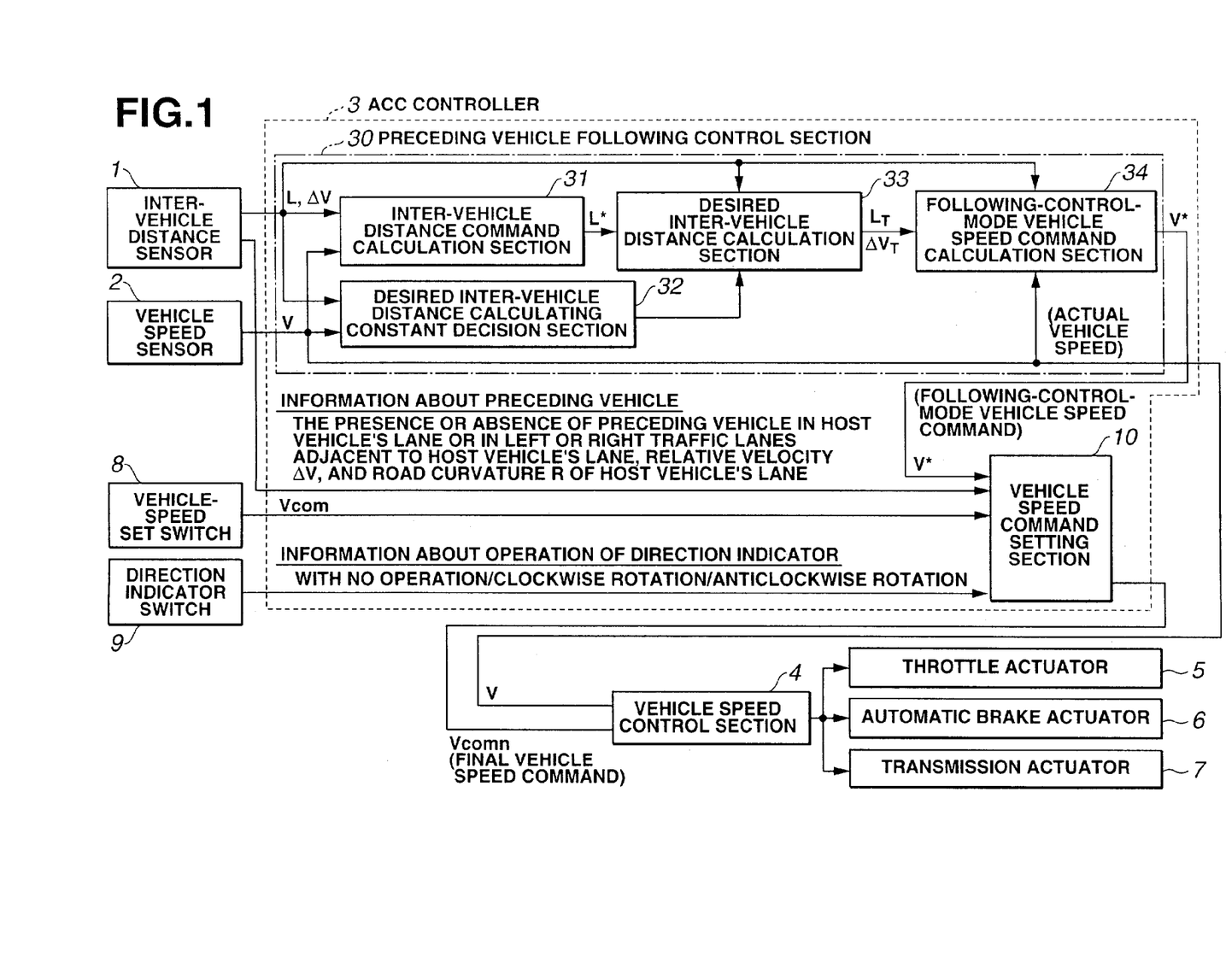
FIG. 1 is a block diagram illustrating an embodiment of an adaptive cruise control system (ACC system).

Referring now to the drawings, particularly to FIG. 1, the adaptive cruise control (ACC) system of the embodiment is exemplified in an automatic speed control system capable of performing transmission ratio control, engine control and brake control, for controlling the host vehicle's speed and the host vehicle's distance from a preceding vehicle, often called an "inter-vehicle distance" or a "vehicle-to-vehicle distance". As shown in FIG. 1, an automatic following controller or an adaptive vehicle speed control ECU (ACC controller) 3 generally comprises a microcomputer. ACC controller 3 includes an input/output interface (I/O), memories (RAM, ROM), and a microprocessor or a central processing unit (CPU). The input/output interface (I/O) of ACC controller 3 receives input information from various engine/vehicle switches and sensors, namely an inter-vehicle distance sensor (or an object detector) 1, a vehicle speed sensor 2, a vehicle-speed set switch (simply, a set switch) 8, and a direction indicator switch 9. Within ACC controller 3, the central processing unit (CPU) allows the access by the I/O interface of input informational data signals from the previously-discussed engine/vehicle switches and sensors 1, 2, 8, and 9. The CPU of ACC controller 3 is responsible for carrying the throttle/brake/transmission control program stored in memories and is capable of performing necessary arithmetic and logic operations containing an adaptive cruise control management processing (containing an electronic engine output control achieved through a throttle actuator 5, an automatic brake control achieved through an automatic brake actuator 6, and an automatic shift control achieved through a transmission actuator 7). Computational results (arithmetic calculation results), that is, calculated output signals are relayed through the output interface circuitry of the ACC controller via a vehicle speed control section 4 (containing a vehicle speed servo section and a throttle servo section) to output stages, namely throttle actuator 5 included in an engine output control system, automatic brake actuator 6 included in an automatic brake control system, and transmission actuator 7 included in an automatic shift control system.

A scanning laser radar sensor is used as inter-vehicle distance sensor (object detector) 1 that captures or detects a frontally-positioned object (or a preceding vehicle) relative to the host vehicle. As is generally known, the scanning laser radar sensor includes a scanning device, containing both a transmitter and a receiver. The scanning device of the laser radar sensor transmits a pulse of light (laser beam) in a horizontal line, back and forth. The scanning device measures the time of flight of the pulse of light, and then an inter-vehicle distance L from the host vehicle (ACC vehicle) to the preceding vehicle is calculated based on the time interval from the transmitted pulse (the time when the laser beam is emitted from the host vehicle) to the received pulse (the time when the receiver receives the laser wave reflected from the preceding vehicle). A relative velocity $\Delta V$ of the preceding vehicle with respect to the host vehicle can be calculated based on a derivative $dL/dt$, which is the time rate of change of L with respect to t. Instead of using the derivative $dL/dt$, relative velocity $\Delta V$ of the preceding vehicle with respect to the host vehicle may be computed by differentiating the detected inter-vehicle distance L by way of a band-pass filtering process or a high-pass filtering process. In the shown embodiment, the host vehicle's distance L from preceding vehicles (a relative distance L of a frontally-position object relative to the host vehicle) and relative velocity $\Delta V$ of each of the preceding vehicles with respect to the host vehicle are detected by inter-vehicle distance sensor 1. Note that the aforementioned preceding vehicles mean a preceding vehicle in left or right traffic lanes with respect to the host vehicle's driving lane as well as a frontally-located preceding vehicle in the same lane as the host vehicle. Inter-vehicle distance sensor 1 (the scanning laser radar sensor) also outputs a signal indicative of a road curvature R of the current driving lane (the host vehicle's lane) to the input interface of ACC controller 3. Instead of using laser beam, radio wave or ultrasonic wave may be used to detect inter-vehicle distance L and to derive relative velocity $\Delta V$. Vehicle speed sensor 2 is provided to detect a transmission output speed and to convert the transmission output speed into a host vehicle speed V. The processor of ACC controller 3 includes a vehicle speed command setting section 10 and a preceding-vehicle following control section 30. Preceding-vehicle following control section 30 arithmetically calculates a following-control-mode vehicle speed command value V* based on inter-vehicle distance L, relative speed $\Delta V$, and host vehicle speed V, so that the host vehicle's distance from the preceding vehicle is brought closer to a desired inter-vehicle distance suitable for the following control mode and that the relative velocity of the preceding vehicle with respect to the host vehicle is brought closer to a desired relative velocity suitable for the following control mode. Set switch 8 is an operation switch functioning as a man-machine interface. Set switch 8 is provided for initiating or engaging the constant-speed control function and for outputting a constant-speed-mode vehicle speed command value Vcom, which is manually set by means of set switch 8. A signal from direction indicator switch 9 of the host vehicle is used to determine the presence or absence of a driver's intention for lane changing. In lieu thereof, a signal from a steering angle sensor (not shown) may be used to determine the presence or absence of a driver's intention for lane changing. Vehicle speed command setting section 10 calculates or computes a final vehicle speed command value Vcomn based on all of following-control-mode vehicle speed command value V*, constant-speed-mode vehicle speed command value Vcom, input information from inter-vehicle distance sensor 1 regarding which lane (the host vehicle's lane, the right traffic lane, or the left traffic lane) the preceding vehicle is positioned in, road curvature R of the host vehicle's lane, and input information from direction indicator switch 9 regarding the presence or absence of the driver's intention for lane changing. Vehicle speed control section 4 calculates or computes a throttle valve opening command value, a brake fluid pressure command value, and a transmission ratio command value based on the host vehicle speed V and final vehicle speed command value Vcomn, and controls throttle actuator 5, automatic brake actuator 6, and transmission actuator 7, so that the host vehicle speed is brought closer to the final vehicle speed command. Actually, in the shown embodiment, host vehicle speed V is brought closer to final vehicle speed command value Vcomn by way of closed-loop feedback control within vehicle speed control section 4. Instead of using the closed-loop feedback control, in order to provide a vehicle speed control system that withstands effects not considered in the analysis and design phase, for example, measurement noise, unmodeled dynamics, and disturbances such as changes in road gradient or a running resistance, a so-called robust model matching control technique, as disclosed in Japanese Patent Provisional Publication No. 10-272963 (hereinafter is referred to as "JP10-272963"), may be used to bring host vehicle speed V closer to final vehicle speed command value Vcomn. Briefly speaking, the robust model matching control system disclosed in JP10-272963 is comprised of a robust compensator functioning as a disturbance compensator and a model matching compensator that matches a response characteristic of the vehicle speed control system (vehicle speed servo system) with a normative model. The robust compensator estimates and compensates for modeling errors of the controlled system and disturbances such as the road-gradient changes or running resistances, in such a manner as to agree an actual control characteristic with a linear model. The robust compensator has a robust filter, which is often constructed by a low-pass filter that passes signals at a frequency below a given cutoff frequency and attenuates signals with a frequency above the given cutoff frequency. The higher cutoff frequency, on the one hand, tends to enhance the disturbance filtering performance. The excessively high cutoff frequency, on the other hand, results in an unstable closed-loop system containing the robust compensator. Thus, taking into account the total system performance, the cutoff frequency of the robust filter has to be determined. The model matching compensator has a normative model R2(s) corresponding to a feedforward control section and a normative model R1(s) corresponding to a feedback control section. Input/output response characteristics can be determined based on the normative model R2(s) for the feedforward control section. On the other hand, the disturbance eliminating performance and system stability can be determined based on the normative model R1(s) for the feedback control section. Assuming that the vehicle speed servo system is designed or constructed by the previously-discussed robust model matching system, it is possible to reconcile a high control responsiveness that follows modeling errors, uncertain parameters, unmodeled dynamics, and disturbances such as road-gradient changes or running resistances, and a superior system stability that an internal variable can be quickly converged with no divergence. Throttle actuator 5 adjusts the throttle valve opening in response to the throttle valve opening command value calculated by vehicle speed control section 4. Automatic brake actuator 6 adjusts the brake fluid pressure in response to the brake fluid pressure command value. Transmission actuator 7 adjusts the transmission ratio in response to the transmission ratio command value. A stepped automatic transmission whose number of speeds is limited or finite may be used as the automatic transmission. Alternatively, a continuously variable transmission whose transmission ratio is steplessly variable within limits may be used as the automatic transmission. In the system of the shown embodiment, on the assumption that the final vehicle speed command value Vcomn generated by vehicle speed command setting section 10 is an input and the host vehicle speed V detected by vehicle speed sensor 2 is an output, a transfer characteristic Gv(s) of the vehicle speed control system is approximated to a first-order time lag system represented by the following expression (1).

$$Gv(s) = \frac{\omega v}{s + \omega v} \quad (1)$$

where ωv denotes a break-point frequency (simply, a break frequency) of the transfer characteristic of vehicle speed control section 4.

As can be seen from the block diagram of FIG. 1, ACC controller 3 includes an inter-vehicle distance command calculation section 31, a desired inter-vehicle distance calculating constant decision section 32, a desired inter-vehicle distance calculation section 33, and a following-control-mode vehicle speed command calculation section 34. The input interface of VCC controller 3 receives input information from inter-vehicle distance sensor 1, namely the host vehicle's distance L from the preceding vehicle and relative velocity ΔV of the preceding vehicle with respect to the host vehicle, and input information from vehicle speed sensor 2, namely the host vehicle's speed V. When inter-vehicle sensor 1 captures, recognizes, senses or detects the preceding vehicle (or the relevant target vehicle), inter-vehicle distance command calculation section 31 arithmetically calculates an inter-vehicle distance command value L* based on host vehicle speed V and relative velocity ΔV, from the following expressions (2) and (3). First, a vehicle speed Vt of the preceding vehicle (the relevant target vehicle) is arithmetically calculated based on host vehicle speed V and relative velocity ΔV, from the following expression (2).

$$Vt = V + \Delta V \quad (2)$$

Second, inter-vehicle distance command value L* is arithmetically calculated as a function of the preceding vehicle speed Vt, from the following expression (3).

$$L^* = a \cdot Vt + Lof = a \cdot (V + \Delta V) + Lof \quad (3)$$

where "a" denotes a coefficient and Lof denotes an offset.

Alternatively, inter-vehicle distance command value L* is arithmetically calculated as a function of host vehicle speed V from the following expression (4).

$$L^* = a' \cdot V + Lof' \quad (4)$$

where "a'" denotes a coefficient and Lof' denotes an offset. Instead of using inter-vehicle distance command value L* calculated from the expressions (3) or (4), a set value that is settable by the driver or the vehicle occupant may be used as inter-vehicle distance command value L*.

In the inter-vehicle distance control system that inter-vehicle distance command value L* generated from inter-vehicle distance command calculation section 31 is an input and the actual inter-vehicle distance L monitored or detected by inter-vehicle distance sensor 1 is an output, desired inter-vehicle distance calculating constant decision section 32 arithmetically calculates or determines a dimensionless damping coefficient $\zeta_T$ and a natural frequency $\omega_T$ of the inter-vehicle distance control system on the basis of an inter-vehicle distance deviation ΔL of the actual inter-vehicle distance L from inter-vehicle distance command value L* and relative velocity ΔV, such that the response characteristic of the inter-vehicle distance control, according to which the actual inter-vehicle distance L is brought closer to inter-vehicle distance command value L*, is matched with an optimal response characteristic based on inter-vehicle distance deviation ΔL and relative velocity ΔV. The optimal response characteristic will be hereinafter referred to as a "desired inter-vehicle distance control response characteristic". Inter-vehicle distance deviation ΔL is calculated by subtracting inter-vehicle distance command value L* from inter-vehicle distance L (see the following expression (5)).

$$\Delta L = L - L^* \quad (5)$$

More concretely, to achieve the optimal response characteristic of the inter-vehicle distance control under various driving and following conditions such as during passing or during squeezing in between the vehicles, the system of the embodiment pre-stores a predetermined ΔL–ΔV–$\zeta_T$ characteristic map showing how dimensionless damping coefficient $\zeta_T$ has to be varied relative to inter-vehicle distance deviation ΔL and relative velocity ΔV, and a predetermined ΔL–ΔV–$\omega_T$ characteristic map showing how natural frequency $\omega_T$ of the inter-vehicle distance control system has to be varied relative to inter-vehicle distance deviation ΔL and relative velocity ΔV. That is, within desired inter-vehicle distance calculating constant decision section 32, dimensionless damping coefficient $\zeta_T$ and natural frequency $\omega_T$ are both map-retrieved from the respective characteristic maps, and then the map-retrieved damping coefficient $\zeta_T$ and natural frequency $\omega_T$ are determined as desired inter-vehicle distance calculating constants.

Desired inter-vehicle distance calculation section 33 arithmetically calculates a desired inter-vehicle distance $L_T$ and a desired relative velocity $\Delta V_T$ by filtering inter-vehicle distance command value L* through a second-order filter represented by the following expression (6), based on damping coefficient $\zeta_T$ and natural frequency $\omega_T$ determined by desired inter-vehicle distance calculating constant decision section 32 in order for the response characteristic of the inter-vehicle distance control system to be matched with the optimal response characteristic based on both of inter-vehicle distance deviation ΔL and relative velocity ΔV, that is, the desired inter-vehicle distance control response characteristic. Hereupon, an inter-vehicle distance detected just after the laser radar of inter-vehicle sensor 1 captures and recognizes the preceding vehicle, is set to an initial value L0 of inter-vehicle distance L. Likewise, a relative velocity detected just after the laser radar of inter-vehicle sensor 1 captures or recognizes the preceding vehicle, is set to an initial value ΔV0 of relative velocity ΔV.

$$\frac{d}{dt}\begin{bmatrix} L_T(t) \\ \Delta V_T(t) \end{bmatrix} = \begin{bmatrix} 0 & 1 \\ -\omega_T^2 & -2\zeta_T\omega_T \end{bmatrix}\begin{bmatrix} L_T(t) \\ \Delta V_T(t) \end{bmatrix} + \begin{bmatrix} 0 \\ \omega_T^2 \end{bmatrix}L*(t) \quad (6)$$

As appreciated from the above, desired inter-vehicle distance $L_T$ and desired relative velocity $\Delta V_T$, calculated by the above expression (6), correspond to final inter-vehicle distance command values being cooperative with each other to schedule a change in the actual host vehicle's distance L from the preceding vehicle and a change in relative velocity ΔV with respect to time, so that the actual inter-vehicle distance L is brought closer to or converged into inter-vehicle distance command value L* with the desired inter-vehicle distance control response characteristic.

By way of the expansion and Laplace transformation for the expression (6), the following expression (7) is obtained.

$$\frac{L_T(s)}{L*(s)} = \frac{\omega_T^2}{s^2 + 2\zeta_T\omega_T s + \omega_T^2} \quad (7)$$

The expression (7), represented by a quadratic expression, is a transfer function of desired inter-vehicle distance $L_T(s)$ (corresponding to the Laplace transform of the output variable) to inter-vehicle distance command value L*(s) (corresponding to the Laplace transform of the input variable). The adaptive cruise control system of the embodiment feedback-controls so that the actual inter-vehicle distance L is brought closer to the desired inter-vehicle distance $L_T$ (the final inter-vehicle distance command value) defined by the expression (7). As discussed above, according to the system of the embodiment, damping coefficient $\zeta_T$ and a natural frequency $\omega_T$ of the inter-vehicle distance control system are properly set to achieve the optimal response characteristic based on both of inter-vehicle distance deviation ΔL and relative velocity ΔV, in other words, the desired inter-vehicle distance control response characteristic, under various driving and following scenes. Thus, it is possible to realize the optimal response to inter-vehicle distance control under any driving and following conditions.

Taking into account the desired inter-vehicle distance control response characteristic, in a passing scene or a squeezing scene, it is preferable to moderately converge the actual inter-vehicle distance L into inter-vehicle distance command value L* without a rapid deceleration rate, if the actual host vehicle's distance L from the preceding vehicle is shorter than inter-vehicle distance command value L* but relative velocity ΔV of the preceding vehicle with respect to the host vehicle is low. On the other hand, when the host vehicle is approaching to the preceding vehicle, it is preferable to moderately converge the actual inter-vehicle distance L into inter-vehicle distance command value L* without a rapid deceleration rate if relative velocity ΔV is high but inter-vehicle distance L is longer than inter-vehicle distance command value L*. When the host vehicle is in either one of such following scenes, such as a passing scene, a squeezing scene, and an approaching scene, the inter-vehicle distance control system tends to exhibit a response characteristic of second order that the actual inter-vehicle distance L is gradually converged into inter-vehicle distance command value L*, while overshooting and/or undershooting inter-vehicle distance command value L*. As may be appreciated from the above, such a response characteristic of second order can be realized or attained by the second-order filter represented by the expressions (6) and (7).

Following-control-mode vehicle speed command calculation section 34 arithmetically calculates following-control-mode vehicle speed command value V*, using predetermined constants $f_v$ and $f_L$, from the following expression (8).

$$V^*=V(t)+\Delta V(t)-[f_v\{\Delta V_T(t)-\Delta V(t)\}+f_L\{L_T(t)-L(t)\}] \quad (8)$$

where $f_v$ denotes the predetermined constant that is multiplied with a desired relative velocity deviation $\{\Delta V_T(t)-\Delta V(t)\}$ of desired relative velocity $\Delta V_T(t)$ from relative velocity $\Delta V(t)$ detected, and $f_L$ denotes the predetermined constant that is multiplied with a desired inter-vehicle distance deviation $\{L_T(t)-L(t)\}$ of desired inter-vehicle distance $L_T(t)$ from inter-vehicle distance L(t) detected.

The operation of vehicle speed command setting section 10 is hereunder described in detail in reference to the flow charts shown in FIGS. 2–6.

Figure 2:
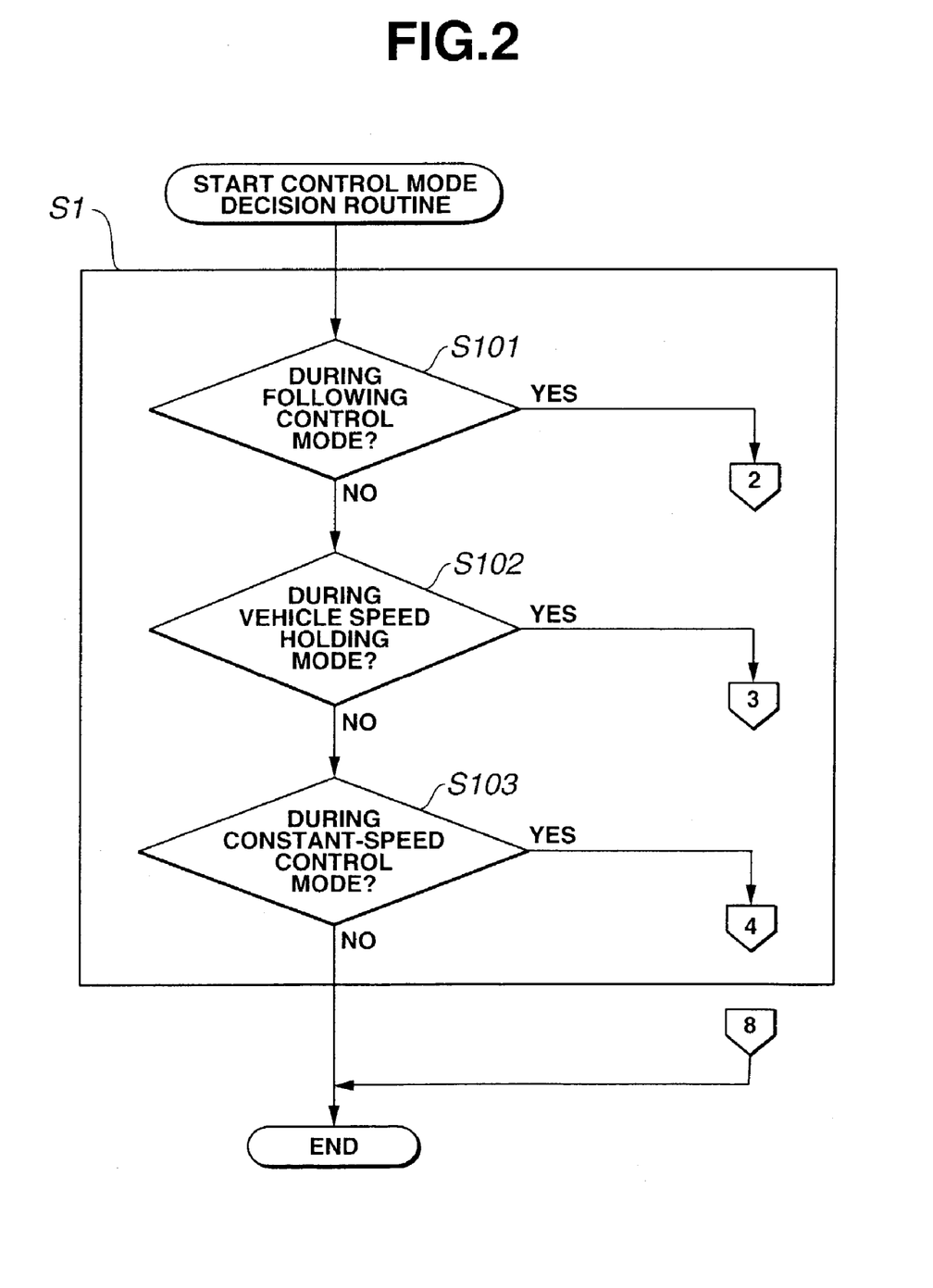
FIG. 2 is a flow chart showing a control mode decision routine executed within a vehicle speed command setting section of the ACC system of the embodiment.

As seen from the flow chart of FIG. 2, the system of the embodiment can execute a selected one of three control modes, namely a following control mode, a vehicle speed holding mode, and a constant-speed control mode. In the following control mode, following-control-mode vehicle speed command value V*, which is based on inter-vehicle distance L, relative speed ΔV, and host vehicle speed V, and calculated by preceding-vehicle following control section 30, is set as final vehicle speed command value Vcomn, so as to perform the preceding-vehicle following control. In the vehicle speed holding mode, the system operates to maintain or hold the host vehicle speed at final vehicle speed command value Vcomn given when a transition to the vehicle speed holding mode occurs, until such time that a vehicle-speed holding time t_hold has expired from the time point of the transition to the vehicle speed holding mode. On the other hand, in the constant-speed control mode, the host vehicle travels at a constant speed whose upper limit is limited by constant-speed-mode vehicle speed command value Vcom, manually set by means of set switch 8. Concretely, as a current host vehicle speed, the system determines or sets final vehicle speed command value Vcomn given when a transition to the constant-speed control mode occurs. After the transition to the constant-speed control mode, the system executes the host vehicle speed control so that final vehicle speed command value Vcomn is brought closer to the upper vehicle speed limit, that is, constant-speed-mode vehicle speed command value Vcom at an acceleration/deceleration rate ranging from −0.06 G to +0.06 G.

Vehicle speed command setting section 10 of the ACC system of the embodiment executes the control routines shown in FIGS. 2–6. The control mode decision routine (see FIG. 2), arithmetic operations for the following control mode (see FIG. 3), the vehicle speed holding mode (see FIG. 4), the constant-speed control mode (see FIG. 5), and the vehicle speed command Vcomn determination routine (see FIG. 6) are executed as time-triggered interrupt routines to be triggered every predetermined sampling time intervals such as 10 milliseconds.

First, at step S101 of the control mode decision routine shown in FIG. 2, a check is made to determine whether the control mode of the ACC system is equal to the following control mode. When the answer to step S101 is in the affirmative (YES), the routine jumps from step S101 to step S201 shown in FIG. 3. Conversely when the answer to step S101 is in the negative (NO), the routine proceeds from step S101 to step S102.

At step S102, a check is made to determine whether the control mode of the ACC system is equal to the vehicle speed holding mode. When the answer to step S102 is in the affirmative (YES), the routine jumps from step S102 to step S301 shown in FIG. 4. Conversely when the answer to step S102 is in the negative (NO), the routine proceeds from step S102 to step S103.

At step S103, a check is made to determine whether the control mode of the ACC system is equal to the constant-speed control mode. When the answer to step S103 is in the affirmative (YES), the routine jumps from step S103 to step S401 shown in FIG. 5. Conversely when the answer to step S103 is in the negative (NO), the current execution cycle of the control mode decision routine shown in FIG. 2 terminates.

Figure 3:
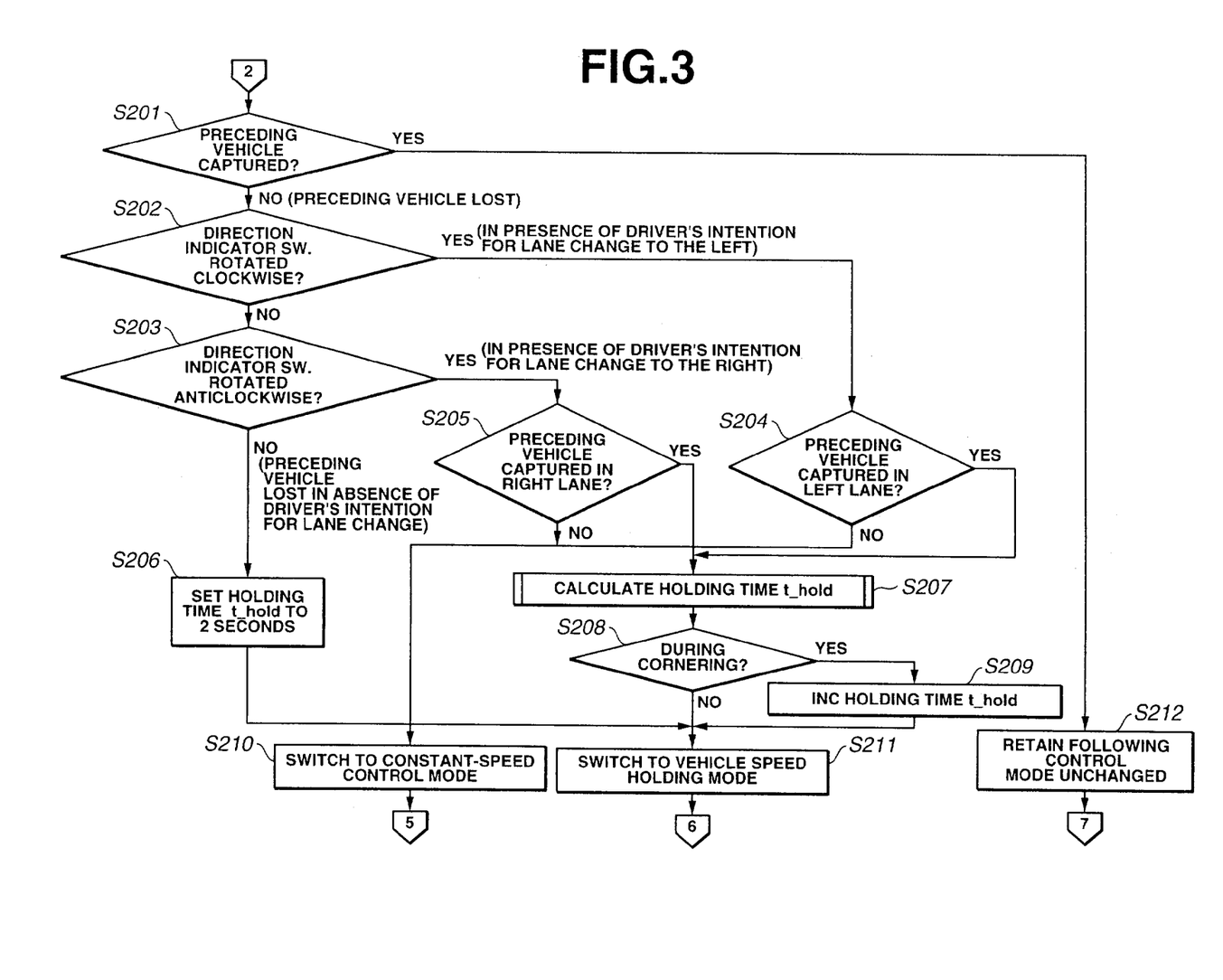
FIG. 3 is a flow chart showing an arithmetic operation in an automatic following control mode.

Referring now to FIG. 3, there is shown the arithmetic operation executed within vehicle speed command setting section 10 during the following control mode.

At step S201, a check is made to determine whether the laser radar of inter-vehicle sensor 1 captures and recognizes the preceding vehicle. When the answer to step S201 is affirmative (YES), the routine proceeds from step S201 to step S212. Conversely when the answer to step S201 is negative (NO), that is, when the preceding vehicle has been lost, the routine proceeds from step S201 to step S202.

At step S202, a check is made to determine whether direction indicator switch 9 is rotated counterclockwise. The counterclockwise rotation of direction indicator switch 9 means a left-hand lane change by the host vehicle. When the answer to step S202 is affirmative (YES), the routine proceeds from step S202 to step S204. Conversely when the answer to step S202 is negative (NO), the routine proceeds from step S202 to step S203.

At step S203, a check is made to determine whether direction indicator switch 9 is rotated clockwise. The clockwise rotation of direction indicator switch 9 means a right-hand lane change by the host vehicle. When the answer to step S203 is affirmative (YES), the routine proceeds from step S203 to step S205. Conversely when the answer to step S203 is negative (NO), the routine proceeds from step S203 to step S206.

At step S204, a check is made to determine whether the laser radar of inter-vehicle sensor 1 captures and recognizes a preceding vehicle in the left traffic lane with respect to the host vehicle's driving lane. When the answer to step S204 is affirmative (YES), the routine proceeds from step S204 to step S207. Conversely when the answer to step S204 is negative (NO), the routine flows from step S204 to step S210.

At step S205, a check is made to determine whether the laser radar of inter-vehicle sensor 1 captures and recognizes a preceding vehicle in the right traffic lane with respect to the host vehicle's driving lane. When the answer to step S205 is affirmative (YES), the routine proceeds from step S205 to step S207. Conversely when the answer to step S205 is negative (NO), the routine flows from step S205 to step S210.

At step S206, vehicle-speed holding time t_hold is set to a predetermined value such as 2 seconds.

At step S207, as detailed later in reference to the preprogrammed relative velocity ΔV versus vehicle-speed holding time t_hold characteristic map shown in FIG. 7, vehicle-speed holding time t_hold is calculated or map-retrieved based on relative velocity ΔV of the preceding vehicle with respect to the host vehicle, in other words, the speed difference ΔV (=Vt−V) obtained by subtracting host vehicle speed V from preceding vehicle speed Vt.

Subsequently to step S207, step S208 occurs. At step S208, a check is made to determine whether the host vehicle goes around a curve. The check of step S208 is based on the inter-vehicle distance sensor signal indicative of road curvature R. For instance, the sensor signal value indicative of road curvature R is compared to a predetermined threshold value such as 300 meters. When the sensor signal value indicative of road curvature R is less than the predetermined threshold value (R<300 meters), the system determines that the vehicle goes around a curve. When the answer to step S208 is affirmative (R<300 meters), the routine proceeds from step S208 to step S209. On the contrary when the answer to step S208 is negative (R≧300 meters), the routine proceeds from step S208 to step S211.

At step S209, vehicle-speed holding time t_hold, calculated through step S207, is incremented by 1 second. The upper limit of vehicle-speed holding time t_hold is two seconds.

Figure 6:
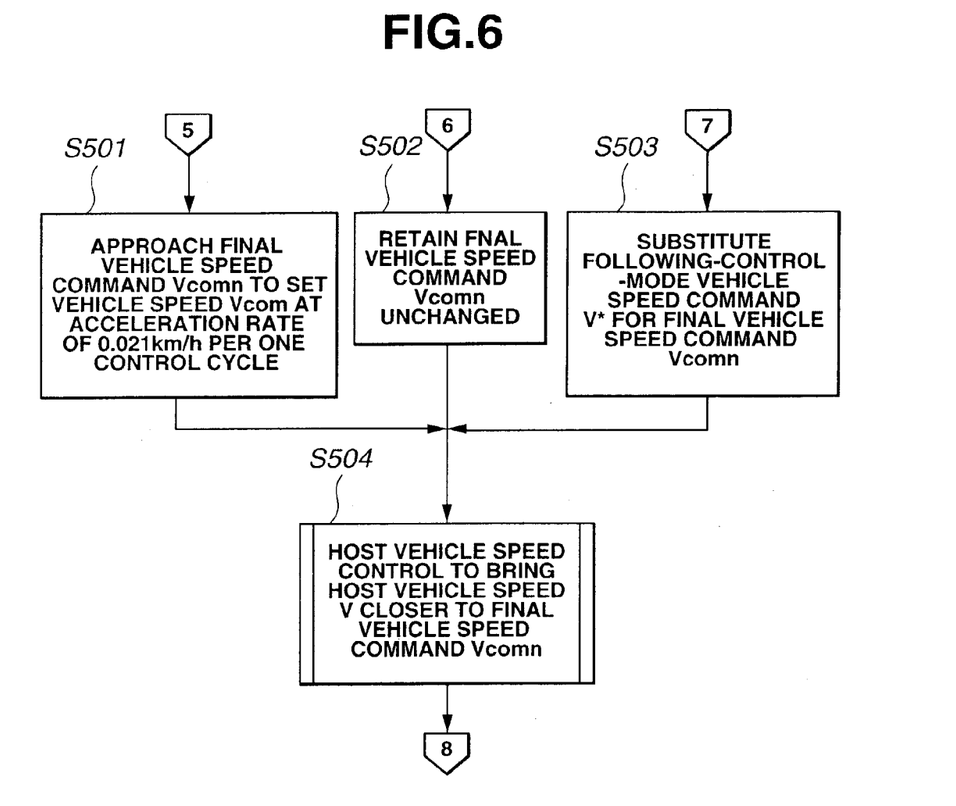
FIG. 6 is a flow chart showing a vehicle speed command determination routine executed within the vehicle speed command setting section.

At step S210, the control mode is switched to the constant-speed control mode, and then the routine jumps from step S210 to step S501 shown in FIG. 6.

At step S211, the control mode is switched to the vehicle speed holding mode, and then the routine jumps from step S211 to step S502 shown in FIG. 6.

At step S212, the system remains the current control mode, that is, the following control mode unchanged, and then the routine jumps from step S212 to step S503 shown in FIG. 6.

According to the following-control-mode arithmetic operation shown in FIG. 3, when the preceding vehicle is captured by means of the laser radar of inter-vehicle sensor 1, the routine advances from step S201 to step S212, and as a result the current control mode (the following control mode) is maintained.

On the contrary, when the preceding vehicle is not captured by means of the laser radar of inter-vehicle sensor 1 and additionally direction indicator switch 9 is in an inoperative state, the routine of FIG. 3 flows from step S201 through steps S202, S203, and S206 to step S211. The negative answers to steps S202 and S203 mean that there is no driver's intention for lane-changing. Thus, the system of the embodiment determines that inter-vehicle distance sensor 1 loses the track of the preceding vehicle owing to external factors such as curves, slopes, weather or the like. Thereafter, vehicle speed holding time t_hold is set to 2 seconds through step S206, and additionally the control mode is switched to the vehicle speed holding mode through step S211.

When inter-vehicle distance sensor 1 loses the track of the preceding vehicle, and direction indicator switch 9 is rotated anticlockwise or clockwise, and additionally the laser radar of inter-vehicle sensor 1 does not capture or recognize a preceding vehicle in either of left and right traffic lanes, corresponding to the direction indicated by direction indicator switch 9, the routine of FIG. 3 flows from step S201 through steps S202 and S204 to step S210, or the routine flows from step S201 through steps S202, S203 and S205 to step S210. The flow from step S201 through steps S202 and S204 to step S210 or the flow from step S201 through steps S202, S203 and S205 to step S210 means that the host vehicle's lane change is initiated due to the driver's intention for passing the preceding vehicle and as a result the laser radar of inter-vehicle distance sensor 1 loses the track of the preceding vehicle (the relevant target vehicle) during the following control mode. In such a case, the control mode is switched to the constant-speed control mode through step S210.

When direction indicator switch 9 is rotated anticlockwise or clockwise at the point of time when inter-vehicle distance sensor 1 loses the track of the preceding vehicle, and additionally the laser radar of inter-vehicle sensor 1 captures or recognizes a preceding vehicle in either of left and right traffic lanes, corresponding to the direction indicated by direction indicator switch 9, the routine of FIG. 3 flows from step S201 through steps S202 and S204 to step S207, or the routine flows from step S201 through steps S202, S203 and S205 to step S207. In the presence of the flow from step S201 through steps S202 and S204 to step S207, or in the presence of the flow from step S201 through steps S202, S203 and S205 to step S207, the system detects or determines the vehicle positioned in either of left and right traffic lanes, corresponding to the direction indicated by direction indicator switch 9 in other words, the direction in which the driver intends to change a lane, as a candidate for the next preceding vehicle after the lane change by the host vehicle. Thereafter, in the system of the shown embodiment, vehicle-speed holding time t_hold is map-retrieved based on relative velocity ΔV of the candidate for the preceding vehicle with respect to the host vehicle, in other words, the speed difference ΔV (=Vt−V) between preceding vehicle speed Vt and host vehicle speed V, from the preprogrammed relative velocity ΔV versus vehicle-speed holding time t_hold characteristic map shown in FIG. 7. As seen from the preprogrammed ΔV−t_hold characteristic map of FIG. 7, when preceding vehicle speed Vt is less than or equal to host vehicle speed V, that is, in case of Vt≦V, holding time t_hold is set to 2 seconds. Conversely when preceding vehicle speed Vt is greater than host vehicle speed V, that is, in case of Vt>V, and relative velocity ΔV is within a range from 0 to 5 km/h, holding time t_hold gradually reduces from 2 seconds to "0" in a linear fashion, as relative velocity ΔV increases when relative velocity ΔV is greater than or equal to 5 km/h, holding time t_hold is fixed to "0".

Thereafter, when the system determines that the host vehicle goes around a curve through step S208, the routine of FIG. 3 flows from step S208 via step S209 to step S211.

Generally, there is an increased tendency for the laser radar of inter-vehicle distance sensor 1 of the host vehicle to momentarily lose the track of the preceding vehicle during cornering. In the event that the laser radar of inter-vehicle distance sensor 1 of the host vehicle loses the track of the preceding vehicle under a particular condition where the driver waits for a chance of lane changing with direction indicator switch 9 rotated clockwise or anticlockwise, an automatic accelerating mode tends to be initiated and thus the host vehicle is automatically accelerated up to a preset vehicle speed. In such a case, the host vehicle's distance L from the preceding vehicle tends to reduce inadvertently or undesirably due to the automatic accelerating control. To avoid this, first, the system of the embodiment determines, based on the comparison result of road curvature R with the predetermined threshold value (300 meters), whether the host vehicle goes around a curve. In case of R<300 meters, that is, the road curvature is less than the predetermined threshold value (300 meters), the system determines that the host vehicle goes around a curve and therefore the routine proceeds from step S208 to step S209. Thus, vehicle-speed holding time t_hold, calculated through step S207, is incremented by 1 second through step S209, and then the control mode is switched from the following control mode to the vehicle speed holding mode through step S211. In the shown embodiment, road curvature R, detected by inter-vehicle distance sensor 1, is utilized to determine whether the host vehicle goes around a curve. Instead of using the comparison result between road curvature R and its threshold value (e.g., 300 meters), on automotive vehicles employing a car navigation system, information from the car navigation system may be used.

Conversely, in case of R≧300 meters, that is, the road curvature is greater than or equal to the predetermined threshold value and therefore the system determines that the host vehicle does not go around a curve, the routine proceeds from step S208 directly to step S211. Thus, vehicle-speed holding time t_hold, calculated through step S207, remains unchanged, and then the control mode is switched from the following control mode to the vehicle speed holding mode through step S211.

Figure 4:
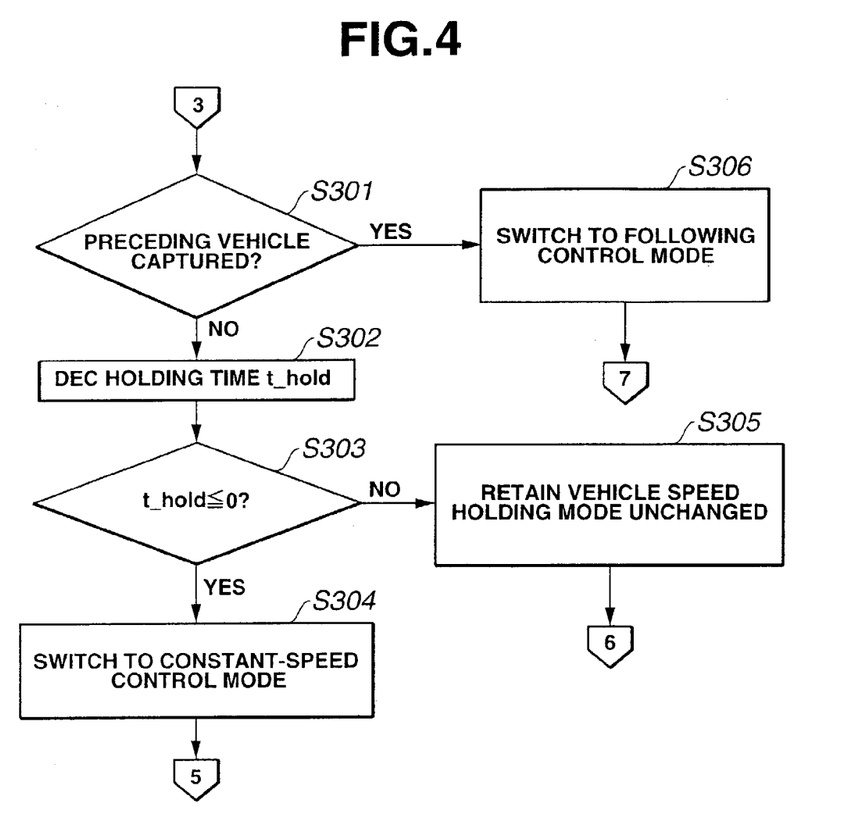
FIG. 4 is a flow chart showing an arithmetic operation in a vehicle speed holding mode.

Referring now to FIG. 4, there is shown the arithmetic operation executed within vehicle speed command setting section 10 during the vehicle speed holding mode.

At step S301, a check is made to determine whether the laser radar of inter-vehicle sensor 1 captures and recognizes the preceding vehicle. When the answer to step S301 is affirmative (YES), the routine proceeds from step S301 to step S306. Conversely when the answer to step S301 is negative (NO), that is, when the preceding vehicle has been lost, the routine proceeds from step S301 to step S302.

At step S302, vehicle-speed holding time t_hold is decremented by 1 second (unit time).

At step S303, a check is made to determine whether holding time t_hold is less than or equal to "0". In case of t_hold≦0, the routine proceeds from step S303 to step S304. Conversely in case of t_hold>0, the routine proceeds from step S303 to step S305.

At step S304, the control mode is switched to the constant-speed control mode, and then the routine jumps from step S304 to step S501 of FIG. 6.

At step S305, the system remains the current control mode, that is, the vehicle speed holding mode unchanged, and then the routine jumps from step S305 to step S502 of FIG. 6.

At step S306, the control mode is switched to the following control mode, and then the routine jumps from step S306 to step S503 of FIG. 6.

According to the vehicle-speed-holding-mode arithmetic operation shown in FIG. 4, when the preceding vehicle is captured by means of the laser radar of inter-vehicle sensor 1, the routine advances from step S301 to step S306, and as a result the control mode is switched from the vehicle speed holding mode to the following control mode.

On the contrary, when the preceding vehicle is not captured by means of the laser radar of inter-vehicle sensor 1 and additionally holding time holding time t_hold is greater than "0", that is, in case of t_hold>0, the routine of FIG. 4 flows from step S301 through steps S302, and S303 to step S305. As a result of this, the current control mode (the vehicle speed holding mode) is maintained.

When the preceding vehicle is not captured by means of the laser radar of inter-vehicle sensor 1 and additionally holding time holding time t_hold is less than or equal to "0", that is, in case of t_hold≦0, the routine of FIG. 4 flows from step S301 through steps S302, and S303 to step S304. As a result, the control mode is switched from the vehicle speed holding mode to the constant-speed control mode.

Figure 5:
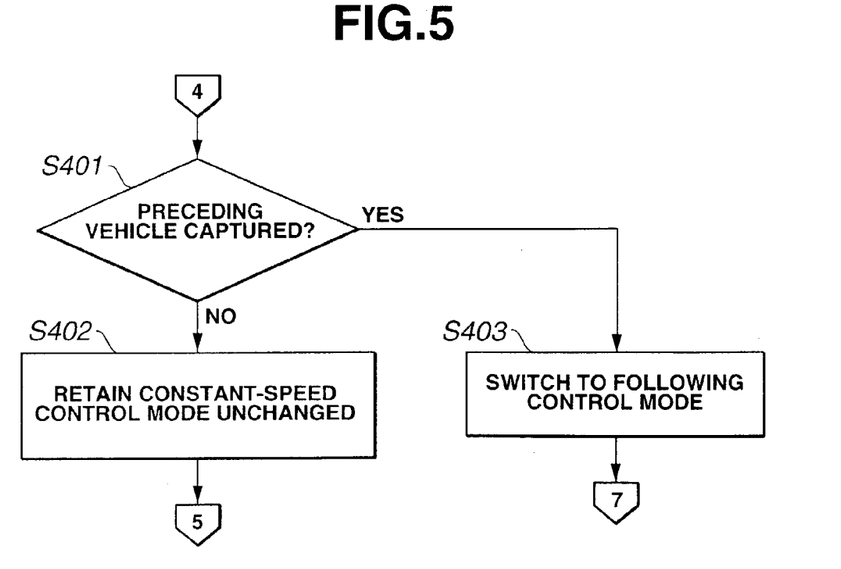
FIG. 5 is a flow chart showing an arithmetic operation in a constant-speed control mode.

Referring now to FIG. 5, there is shown the arithmetic operation executed within vehicle speed command setting section 10 during the constant-speed control mode.

At step S401, a check is made to determine whether the laser radar of inter-vehicle sensor 1 captures and recognizes the preceding vehicle. When the answer to step S401 is affirmative (YES), the routine proceeds from step S401 to step S403. Conversely when the answer to step S401 is negative (NO), that is, when the laser radar of inter-vehicle sensor 1 loses the tack of the preceding vehicle, the routine proceeds from step S401 to step S402.

At step S402, the system remains the current control mode, that is, the constant-speed control mode unchanged, and then the routine jumps from step S402 to step S501 of FIG. 6.

At step S403, the control mode is switched to the following control mode, and then the routine jumps from step S403 to step S503 of FIG. 6.

Referring now to FIG. 6, there is shown the vehicle speed command Vcomn determination routine. The vehicle speed command Vcomn determination routine is executed as time-triggered interrupt routine to be triggered every control cycles (predetermined intervals such as 10 milliseconds). Using the vehicle speed command Vcomn determination routine of FIG. 6, the system arithmetically calculates final vehicle speed command value Vcomn to be generated from vehicle speed command setting section 10 to vehicle speed control section 4 for each of three control modes namely the following control mode, the vehicle speed holding mode, and the constant-speed control mode.

During the constant-speed control mode, by way of step S501 the system executes the host vehicle speed control so that final vehicle speed command value Vcomn is brought closer to the upper speed limit, that is, constant-speed-mode vehicle speed command value (the set vehicle speed) Vcom at an acceleration rate of +0.021 km/h (corresponding to +0.06 G) per one control cycle (10 milliseconds), when final vehicle speed command value Vcomn differs from constant-speed-mode vehicle speed command value Vcom, manually set by means of set switch 8.

During the vehicle speed holding mode, by way of step S502 the system operates to retain final vehicle speed command value Vcomn unchanged. In other words, the current value $Vcomn_{(n)}$ of final vehicle speed command value Vcomn is updated by the previous value $Vcomn_{(n-1)}$ calculated one cycle before.

During the following control mode, by way of step S503 the system operates to substitute following-control-mode vehicle speed command value V*, calculated by preceding-vehicle following control section 30, for final vehicle speed command value Vcomn.

In this manner, final vehicle speed command value Vcomn suitable for either of the three control modes is output from vehicle speed command setting section 10 to vehicle speed control section 4. Then, to execute the host vehicle speed control processing suitable for each control mode, at step S504, vehicle speed control section 4 controls each of throttle actuator 5, automatic brake actuator 6, and transmission actuator 7, so that the actual host vehicle speed V is brought closer to final vehicle speed command value Vcomn calculated and determined by vehicle speed command setting section 10.

The details of the host vehicle speed control processing suitable for the following control mode, executed by the system of the embodiment, are hereunder described in detail.

When the host vehicle's lane change to a passing lane occurs due to the driver's intention for passing the preceding vehicle during the following control mode, the control mode is switched to the constant-speed control mode (see the flow from step S201 through steps S202 and S204 to step S210 or the flow from step S201 through steps S202, S203 and S205 to step S210 in FIG. 3). Thereafter, as can be appreciated from step S501 of FIG. 6, the system executes the host vehicle speed control so that final vehicle speed command value Vcomn approaches to constant-speed-mode vehicle speed command value (the set vehicle speed) Vcom, manually set by means of set switch 8. Concretely, in order to initiate the host vehicle speed control processing suited for the constant-speed control mode, at step S504, vehicle speed control section 4 controls each of actuators 5, 6, and 7, so that the actual host vehicle speed V is brought closer to the set vehicle speed Vcom.

Figure 7:
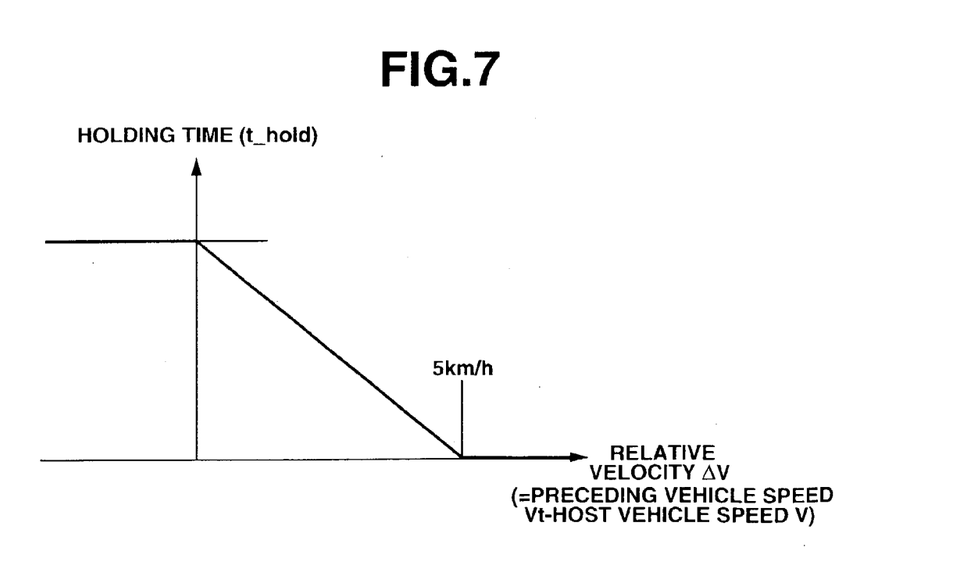
FIG. 7 is a preprogrammed relative velocity $\Delta V$ versus vehicle-speed holding time t_hold characteristic map.

When the host vehicle's lane change occurs due to the driver's intention during the following control mode and the laser radar captures a preceding vehicle in either of left and right traffic lanes, corresponding to the direction indicated by direction indicator switch 9, after the lane change, and additionally the host vehicle does not go around a curve, vehicle-speed holding time t_hold is map-retrieved from the preprogrammed relative velocity ΔV versus vehicle-speed holding time t_hold characteristic map shown in FIG. 7 and then the control mode is switched to the vehicle speed holding mode (see the flow from step S201 through steps S202, S204, S207 and S208 to step S211 or the flow from step S201 through steps S202, S203, S205, S207 and S208 to step S211 in FIG. 3). Thereafter, the system retains final vehicle speed command value Vcomn unchanged, and in order to initiate the host vehicle speed control processing suited for the vehicle speed holding mode, at step S504, vehicle speed control section 4 controls each of actuators 5, 6, and 7, so that the actual host vehicle speed V is brought closer to final vehicle speed command value Vcomn (see the flow from step S502 to step S504 in FIG. 6). In more detail, during the vehicle speed holding mode, the system keeps final vehicle speed command value Vcomn constant until such time that vehicle-speed holding time t_hold has expired from the time point of the transition to the vehicle speed holding mode. As soon as vehicle-speed holding time t_hold has expired, the control mode is switched from the vehicle speed holding mode to the following control mode (see the flow from step S03 via steps S304 and S301 to step S306 in FIG. 4).

When, after the lane change, preceding vehicle speed Vt of the preceding vehicle positioned in the new host vehicle's driving lane after lane changing is less than host vehicle speed V (in case of Vt<V, in other words, ΔV (=Vt−V)<0), vehicle-speed holding time t_hold is set to 2 seconds (see the ΔV–t_hold characteristic map shown in FIG. 7). That is, the transition to the following control mode can be retarded by the delay time (2 seconds).

When the host vehicle's lane change occurs due to the driver's intention during the following control mode and the laser radar captures a preceding vehicle in either of left and right traffic lanes, corresponding to the direction indicated by direction indicator switch 9, after the lane change, and additionally the host vehicle goes around a curve, vehicle-speed holding time t_hold, calculated through step S207, is incremented by 1 second (see the flow from step S207 via step S208 to step S209 in FIG. 3). Incrementing vehicle-speed holding time t_hold by 1 second means that the transition to the following control mode is retarded.

The adaptive cruise control (ACC) system of the embodiment has the following effects.

Immediately when the inter-vehicle distance sensor loses the preceding vehicle during the following control mode and additionally the host vehicle's lane change occurs due to the driver's intention for lane changing, the control mode can be switched to the constant-speed control mode (see the flow from step S201 through steps S202 and S204 to step S210 or the flow from step S201 through steps S202, S203 and S205 to step S210), so that the actual host vehicle speed V is brought closer to the set vehicle speed Vcom, manually set by means of set switch 8. Therefore, even when the inter-vehicle distance sensor loses the track of the preceding vehicle owing to the host vehicle's lane change for passing during the following control mode, the vehicle speed holding mode (in other words, the vehicle speed increase restriction control) can be effectively inhibited or canceled or released and in lieu thereof the constant-speed control mode (in other words, the automatic accelerating control) can be timely initiated. Just after the host vehicle's lane change, it is unnecessary to depress the accelerator pedal by the driver's foot, and thus it is realize a better acceleration feel and a better passing ability and ensuring an enhanced vehicle's driveability matching the driver's sense.

When the inter-vehicle distance sensor captures and recognizes a vehicle positioned in the left or right traffic lanes, corresponding to the direction indicated by direction indicator switch 9, as a candidate for the next preceding vehicle after the lane change by the host vehicle, vehicle-speed holding time t_hold is map-retrieved based on relative velocity $\Delta V$ (=Vt−V) of the candidate for the preceding vehicle with respect to the host vehicle, from the preprogrammed $\Delta V$−t_hold characteristic map shown in FIG. 7. After the map-retrieval, the control mode is temporarily instantaneously switched from the following control mode to the vehicle speed holding mode. After temporary switching to the vehicle speed holding mode, the control mode is finally switched to the following control mode at once, irrespective of vehicle-speed holding time t_hold, since the inter-vehicle distance sensor captures and recognizes the vehicle positioned in the left or right traffic lanes, corresponding to the direction indicated by direction indicator switch 9, as a candidate for the next preceding vehicle after the lane change by the host vehicle. In this manner, according to the system of the embodiment, when the inter-vehicle distance sensor loses the preceding vehicle and then the host vehicle's lane change to a passing lane due to the driver's intention is detected and additionally the candidate for the next preceding vehicle after the lane change is captured and recognized, the vehicle speed holding mode can be effectively released and in lieu thereof the following control mode can be continuously executed (see the flow from step S201 through steps S202, S204, S207, S208, and S211 via step S301 to step S306 or the flow from step S201 through steps S202, S203, S205, S207, S208, and S211 via step S301 to step S306).

For instance, if, after the lane change, preceding vehicle speed Vt of the preceding vehicle positioned in the new host vehicle's driving lane after lane changing is greater than or equal to host vehicle speed V (Vt≧V) and therefore inter-vehicle distance L between the preceding vehicle and the host vehicle tends to gradually increase, it is desirable to increase host vehicle speed V such that the host vehicle smoothly follows after the preceding vehicle, while maintaining the host vehicle's distance from the preceding vehicle at the desired inter-vehicle distance. According to the ACC system of the embodiment, even when the inter-vehicle distance sensor loses the track of the preceding vehicle owing to the host vehicle's lane change during the following control mode, at the early stage of the lane change by the host vehicle the vehicle speed holding mode can be effectively released or inhibited. Therefore, just after the lane change by the host vehicle, the host vehicle can smoothly follow the preceding vehicle with no time delay and the host vehicle's distance from the preceding vehicle can be maintained at a value closer to the desired inter-vehicle distance, thus ensuring an enhanced vehicle's driveability matching the driver's sense during the lane change by the host vehicle. Hitherto, the vehicle speed holding mode was executed for a time period from the time when the inter-vehicle distance sensor loses the track of the preceding vehicle owing to the host vehicle's lane change during the following control mode to the time when the inter-vehicle distance sensor captures and recognizes a vehicle positioned in the left or right traffic lanes, corresponding to the direction indicated by direction indicator switch 9, as a candidate for the next preceding vehicle after the lane change by the host vehicle. During such a time period, the driver may experience a pool feeling (a poor acceleration feel).

Furthermore, as can be appreciated from the preprogrammed $\Delta V$−t_hold characteristic map of FIG. 7, vehicle speed holding time t_hold is determined depending on the state of approach of the host vehicle to the preceding vehicle. The closer the host vehicle approaches to the preceding vehicle, the longer the holding time t_hold becomes. That is, depending on the state of approach of the host vehicle to the preceding vehicle (the degree of approach of the host vehicle to the preceding vehicle), it is possible to properly retard the transition from the vehicle speed holding mode to the following control mode, thereby preventing the host vehicle from undesirably approaching to the candidate for the preceding vehicle after the lane change by the host vehicle, and enabling the host vehicle to smoothly follow the candidate for the preceding vehicle after the host vehicle's lane change.

During cornering, one second is added to the usual vehicle speed holding time t_hold, produced when the host vehicle is traveling on roads except the curved road having road curvature R less than a predetermined road curvature threshold value such as 300 meters, in other words, vehicle speed holding time t_hold, produced during cornering, is set to be longer than that produced when the host vehicle is traveling on roads except the curved road, thereby retarding the transition from the vehicle speed holding mode to the following control mode. During cornering that there is an increased tendency for the laser radar of inter-vehicle distance sensor 1 of the host vehicle to momentarily lose the track of the preceding vehicle, the ACC system of the embodiment can reliably prevent the host vehicle from undesirably approaching to the candidate for the preceding vehicle.

In the shown embodiment, vehicle-speed holding time t_hold is used as an execution time for the vehicle speed holding mode. Instead of using holding time t_hold, a predetermined distance of the preceding vehicle relative to the host vehicle, based on relative velocity $\Delta V$, may be used to determine the execution time for the vehicle speed holding mode.

The entire contents of Japanese Patent Application No. 2002-178862 (filed Jun. 19, 2002) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An adaptive cruise control system capable of executing at least a vehicle speed increase restriction control mode, an automatic accelerating control mode, and a following control mode, comprising:

an object detector that captures a preceding vehicle positioned ahead of a host vehicle;

a lane-change detector that detects the presence or absence of a driver's intention for a lane change by the host vehicle;

an adaptive vehicle speed control unit executing the following control mode during which the host vehicle automatically follows the preceding vehicle, maintaining a host vehicle's distance from the preceding vehicle at a desired inter-vehicle distance when the preceding vehicle exists ahead of the host vehicle;

the adaptive vehicle speed control unit executing the vehicle speed increase restriction control mode during which an increase in the host vehicle's speed is restricted until such time that a time period corresponding to either of a predetermined distance and a predetermined holding time has expired from a time when the object detector loses the preceding vehicle during the following control mode, and thereafter executing the automatic accelerating control mode during which the host vehicle's speed is automatically accelerated up to a set speed;

the adaptive vehicle speed control unit comprising a preceding-vehicle candidate detection section that detects a vehicle positioned in either of left and right traffic lanes corresponding to a direction of the lane change based on the driver's intention as a candidate for a next preceding vehicle after the lane change by the host vehicle, and a vehicle speed increase restriction control releasing section that releases the vehicle speed increase restriction control mode, in presence of the driver's intention for the lane change when the object detector loses the preceding vehicle during the following control mode and the preceding-vehicle candidate detection section detects no candidate for the next preceding vehicle.

2. The adaptive cruise control system as claimed in claim 1, further comprising:

a relative velocity detector that detects a relative velocity of the candidate for the next preceding vehicle with respect to the host vehicle; and a host vehicle's approach state determination section that determines a degree of the host vehicle's approach to the candidate for the next preceding vehicle, based on the relative velocity;

wherein the adaptive vehicle speed control unit varies an execution time for the vehicle speed increase restriction control mode depending on the degree of the host vehicle's approach to the candidate for the next preceding vehicle.

3. The adaptive cruise control system as claimed in claim 2, wherein:

the execution time for the vehicle speed increase restriction control mode increases, as the degree of the host vehicle's approach to the candidate for the next preceding vehicle becomes greater so that the host vehicle approaches closer to the candidate for the next preceding vehicle.

4. The adaptive cruise control system as claimed in claim 1, further comprising:

a relative velocity detector that detects a relative velocity of the candidate for the next preceding vehicle with respect to the host vehicle;

a host vehicle's approach state determination section that determines a degree of the host vehicle's approach to the candidate for the next preceding vehicle, based on the relative velocity; and a cornering state determination section that determines whether the host vehicle goes around a curved road;

wherein the adaptive vehicle speed control unit varies an execution time for the vehicle speed increase restriction control mode depending on the degree of the host vehicle's approach to the candidate for the next preceding vehicle, and wherein the adaptive vehicle speed control unit sets the execution time for the vehicle speed increase restriction control mode so that a first execution time produced when the host vehicle goes around the curved road is longer than a second execution time produced when the host vehicle is traveling on roads except the curved road.

5. The adaptive cruise control system as claimed in claim 4, wherein:

the cornering state determination section determines, based on a comparison result between a road curvature and a road-curvature threshold value, whether the host vehicle goes around the curved road; and the cornering state determination section determines that the host vehicle goes around the curved road, when the road curvature is less than the road-curvature threshold value.

6. An adaptive cruise control system capable of executing at least a vehicle speed increase restriction control mode, an automatic accelerating control mode, and a following control mode, comprising:

an object detection means for capturing a preceding vehicle positioned ahead of a host vehicle;

a lane-change detection means for detecting the presence or absence of a driver's intention for a lane change by the host vehicle;

an adaptive vehicle speed control unit executing the following control mode during which the host vehicle automatically follows the preceding vehicle, maintaining a host vehicle's distance from the preceding vehicle at a desired inter-vehicle distance when the preceding vehicle exists ahead of the host vehicle;

the adaptive vehicle speed control unit executing the vehicle speed increase restriction control mode during which an increase in the host vehicle's speed is restricted until such time that a time period corresponding to either of a predetermined distance and a predetermined holding time has expired from a time when the object detection means loses the preceding vehicle during the following control mode, and thereafter executing the automatic accelerating control mode during which the host vehicle's speed is automatically accelerated up to a set speed;

the adaptive vehicle speed control unit comprising a preceding-vehicle candidate detection means for detecting a vehicle positioned in either of left and right traffic lanes corresponding to a direction of the lane change based on the driver's intention as a candidate for a next preceding vehicle after the lane change by the host vehicle, and a vehicle speed increase restriction control releasing means for releasing the vehicle speed increase restriction control mode, in presence of the driver's intention for the lane change when the object detection means loses the preceding vehicle during the following control mode and the preceding-vehicle candidate detection means detects no candidate for the next preceding vehicle.

7. An adaptive cruise control system capable of executing at least a vehicle speed holding mode, a constant-speed control mode, and a following control mode, comprising:

an object detector that captures a preceding vehicle positioned ahead of a host vehicle;

a lane-change detector that detects the presence or absence of a driver's intention for a lane change by the host vehicle;

an adaptive vehicle speed control unit electronically connected to the object detector and the lane-change detector for executing the following control mode during which the host vehicle automatically follows the preceding vehicle, maintaining a host vehicle's distance from the preceding vehicle at a desired inter-vehicle distance when the preceding vehicle exists ahead of the host vehicle;

the adaptive vehicle speed control unit executing the vehicle speed holding mode during which the host vehicle's speed is restricted until such time that a time period corresponding to either of a predetermined distance and a predetermined holding time has expired from a time when the object detector loses the preceding vehicle during the following control mode, and thereafter executing the constant-speed control mode during which the host vehicle's speed is automatically accelerated up to a set speed, manually set by a man-machine interface; and the adaptive vehicle speed control unit initiating the constant-speed control mode while inhibiting the vehicle speed holding mode, in presence of the driver's intention for the lane change when the object detector loses the preceding vehicle during the following control mode;

the adaptive vehicle speed control unit comprising a preceding-vehicle candidate detection section that detects a vehicle positioned in either of left and right traffic lanes corresponding to a direction of the lane change based on the driver's intention as a candidate for a next preceding vehicle after the lane change by the host vehicle; and the adaptive vehicle speed control unit continuously executing the following control mode while releasing the vehicle speed holding mode, in presence of the driver's intention for the lane change when the object detector loses the preceding vehicle during the following control mode and the preceding-vehicle candidate detection section detects no candidate for the next preceding vehicle.

8. The adaptive cruise control system as claimed in claim 7, further comprising:

a relative velocity detector that detects a relative velocity of the candidate for the next preceding vehicle with respect to the host vehicle; and a host vehicle's approach state determination section that determines a degree of the host vehicle's approach to the candidate for the next preceding vehicle, based on the relative velocity;

wherein the adaptive vehicle speed control unit varies an execution time for the vehicle speed holding mode depending on the degree of the host vehicle's approach to the candidate for the next preceding vehicle.

9. The adaptive cruise control system as claimed in claim 8, wherein:

the execution time for the vehicle speed holding mode increases, as the degree of the host vehicle's approach to the candidate for the next preceding vehicle becomes greater so that the host vehicle approaches closer to the candidate for the next preceding vehicle.

10. The adaptive cruise control system as claimed in claim 7, further comprising:

a relative velocity detector that detects a relative velocity of the candidate for the next preceding vehicle with respect to the host vehicle;

a host vehicle's approach state determination section that determines a degree of the host vehicle's approach to the candidate for the next preceding vehicle, based on the relative velocity; and a cornering state determination section that determines whether the host vehicle goes around a curved road;

wherein the adaptive vehicle speed control unit varies an execution time for the vehicle speed holding mode depending on the degree of the host vehicle's approach to the candidate for the next preceding vehicle, and wherein the adaptive vehicle speed control unit sets the execution time for the vehicle speed holding mode so that a first execution time produced when the host vehicle goes around the curved road is longer than a second execution time produced when the host vehicle is traveling on roads except the curved road.

11. The adaptive cruise control system as claimed in claim 10, wherein:

the cornering state determination section determines, based on a comparison result between a road curvature and a road-curvature threshold value, whether the host vehicle goes around the curved road; and the cornering state determination section determines that the host vehicle goes around the curved road, when the road curvature is less than the road-curvature threshold value.

12. A method of controlling a host vehicle's speed by either of a vehicle speed holding mode, a constant-speed control mode, and a following control mode, the method comprising:

capturing a preceding vehicle positioned ahead of a host vehicle;

detecting the presence or absence of a driver's intention for a lane change by the host vehicle;

executing the following control mode during which the host vehicle automatically follows the preceding vehicle, maintaining a host vehicle's distance from the preceding vehicle at a desired inter-vehicle distance when the preceding vehicle exists ahead of the host vehicle;

executing the vehicle speed holding mode during which the host vehicle's speed is restricted until such time that a time period corresponding to either of a predetermined distance and a predetermined holding time has expired from a time when the preceding vehicle is lost during the following control mode, and thereafter executing the constant-speed control mode during which the host vehicle's speed is automatically accelerated up to a set speed, manually set by a man-machine interface;

initiating the constant-speed control mode while inhibiting the vehicle speed holding mode, in presence of the driver's intention for the lane change when the preceding vehicle is lost during the following control mode;

detecting a vehicle positioned in either of left and right traffic lanes corresponding to a direction of the lane change based on the driver's intention as a candidate for a next preceding vehicle after the lane change by the host vehicle; and continuously executing the following control mode while releasing the vehicle speed holding mode, in presence of the driver's intention for the lane change when the preceding vehicle is lost during the following control mode and there is no detection of the candidate for the next preceding vehicle.

* * * * *